United States Patent [19]
Murdie et al.

[11] Patent Number: 6,077,464
[45] Date of Patent: Jun. 20, 2000

[54] PROCESS OF MAKING CARBON-CARBON COMPOSITE MATERIAL MADE FROM DENSIFIED CARBON FOAM

[75] Inventors: Neil Murdie, South Bend; Charles A. Parker, Granger; James F. Pigford, South Bend, all of Ind.; Dave Narasimhan, Flemington, N.J.; Frank Dillon, Granger, Ind.

[73] Assignee: AlliedSignal Inc., Morristown, N.J.

[21] Appl. No.: 08/970,558

[22] Filed: Nov. 14, 1997

Related U.S. Application Data

[60] Provisional application No. 60/034,821, Dec. 19, 1996.

[51] Int. Cl.$^7$ .................................................. C01B 31/02
[52] U.S. Cl. ............................................................ 264/29.5
[58] Field of Search ............................................ 264/29.5

[56] References Cited

U.S. PATENT DOCUMENTS

| | | | |
|---|---|---|---|
| 3,663,171 | 5/1972 | Granger | 423/445 R |
| 3,937,775 | 2/1976 | Horikiri | 264/29.6 |
| 4,276,246 | 6/1981 | Bonzom et al. | 264/53 |
| 4,537,823 | 8/1985 | Tsang et al. | 428/308.4 |
| 4,605,595 | 8/1986 | Tsang et al. | 428/413 |
| 4,832,870 | 5/1989 | Clough | 252/511 |
| 4,891,203 | 1/1990 | Singer et al. | 423/449.9 |
| 4,975,261 | 12/1990 | Takabatake | 423/445 R |
| 4,986,943 | 1/1991 | Sheaffer et al. | 264/29.1 |
| 5,015,522 | 5/1991 | McCulough et al. | 428/312.2 |
| 5,071,631 | 12/1991 | Takabatake | 423/445 R |
| 5,300,272 | 4/1994 | Simandi et al. | 423/445 R |
| 5,547,737 | 8/1996 | Evans et al. | 428/178 |
| 5,744,510 | 4/1998 | Pekala | 521/181 |
| 5,770,127 | 6/1998 | Abrams et al. | 264/29.1 |
| 5,789,338 | 8/1998 | Kaschmitter et al. | 502/418 |
| 5,868,974 | 2/1999 | Kearns | 264/29.6 |

FOREIGN PATENT DOCUMENTS 562 591  9/1993  European Pat. Off. .

OTHER PUBLICATIONS

PCT/US97/22741 Int'l Search Report dated Apr. 17, 1998.
R. Metha, et al.: "Graphitic carbon foams: Processing and characterization" 1993, American Carbon Society XP002061088 pp. 104 & 105.
"Industry Outlook"; Aviation Week & Space Technology, p. 13/Nov. 13, 1995.
Ultramet Engineered Materials Solutions brochure, 3 pages/Mar., 1992.
ULTRAFOAM "Open–Cell Silicon Carbide Foam" data, Ultramet, Nov. 14, 1992.
Ceramic Bulletin, vol. 70, No. 6, 1991, pp. 1025–1027: "Refractory Ceramic Foams: A Novel, New High–Temperature Structure".
*Processing, Structure, and Morphology of Graphitic Carbon Foams Produced from Anisotropic Pitch*, D. Dutta, C.S. Hill, D.P. Anderson, Mat. Res. Soc. Symp. Proc. vol. 349, "Novel Forms of Carbon II", pp. 61–6, 1994.
*Aligned Graphitic Carbon Foams from Mesophase Pitch*, D. Dutta, C.S. Hill, MD–vol. 53, Cellular and Microcellular Materials, ASME 1994.
*Formulation of a Mathematical Process Model for the Foaming of a Mesophase Carbon Precursor*, S.S. Sandhu, J.W. Hager, Mat. Res. Soc. Symp. Proc. vol. 270, Materials Research Society 1992.
*Novel Hybrid Composites Based on Carbon Foams*, J.W. Hager, M.L. Lake Mat. Res. Soc. Symp. Proc. vol. 270, Materials Research Society 1992.

*Primary Examiner*—Leo B. Tentoni
*Attorney, Agent, or Firm*—Larry J. Palquta

[57] ABSTRACT

A carbon-carbon composite material is made by providing an open-celled carbon foam preform, and densifying the preform with carbonaceous material. The open-celled carbon foam preform may be oxygen stabilized prior to carbonization, and the foam preform densified by CVD, HIP, PIC, VPI, pitch and resin injection, or any combination thereof. The carbon-carbon composite material can be heat treated to provide thermal management materials, structural materials, or a friction material for use in a brake or clutch mechanism.

10 Claims, 11 Drawing Sheets

PROCESS OF MAKING CARBON-CARBON COMPOSITE MATERIAL MADE FROM DENSIFIED CARBON FOAM

This patent application claims priority upon U.S. provisional patent application 60/034,821 filed Dec. 19, 1996.

The present invention relates to the manufacture of a friction material by providing an open-celled foam preform and densifying the preform with carbonaceous material, and relates in particular to the manufacture of a friction material for aircraft brakes.

BACKGROUND OF THE INVENTION

Carbon-carbon composites are widely used for aircraft brake friction materials. Carbon-carbon is attractive because it is lightweight and can operate at very high temperatures, and because it can, pound for pound, absorb a great deal of aircraft energy and convert it to heat. A major drawback with the use of carbon-carbon for this application is the high cost of raw material used to make the parts. Expensive carbon fiber is a significant component; sometimes up to 45% fiber is used in the composite. Fiber costs can often be the single largest contributor to the cost of making a friction material. Another drawback is that manufacture of carbon-carbon is a time-consuming process. The overall process for making a carbon brake disk is measured in weeks, and even months. Long cycle times are undesirable in a modern manufacturing environment. It is highly desirable to provide a process that has a reduced cost and shortened cycle time for making a carbon-carbon composite.

The inventions disclosed herein address those major drawbacks of manufacturing carbon-carbon composites: cost and cycle time. As pointed out by Hager and Lake ("Novel Hybrid Composites Based on Carbon Foams", Mat. Res. Soc. Symp. Proc., Vol. 270, (1992), pp. 29–33), it is possible to create a reticulated carbon foam structure from mesophase pitch. This structure would have substantial fiber-like properties. The foam could subsequently be used to reinforce or form a composite which would behave in many respects like a carbon-fiber reinforced composite. By using a foam preform, instead of carbon fiber, the lower cost fiber precursor can be used, and the preform can be made in a single foaming step, instead of using a laborious process of manufacturing a needled carbon fabric, and needling a preform, or making fiber prepregs which are compacted by subsequent molding.

The use of foam preforms for the manufacture of friction material is disclosed by Tsang et al. in U.S. Pat. No. 4,537,823. However, it is advantageous to: 1) use typically a graphitizable carbon foam from a mesophase pitch, rather than a glassy carbon foam, 2) fill the void spaces with a carbonaceous material, rather than a polymeric material or a slurry, and 3) provide foams with a pore size less than 500 µm to facilitate subsequent densification.

Carbon foams made from mesophase pitch have been disclosed in Mehta et al., "Graphitic Carbon Foams: Processing and Characterization", *American Carbon Society*, 21st Biennial Conference on Carbon, Buffalo, N.Y., Jun. 13–18, 1993. These foams were not densified because the foams were to be used for lightweight structural applications that did not require densification.

Also, foams of carbonaceous material have been known and methods of preparing them have been disclosed for absorption or filtration media and supports for catalysts, etc., and is generally made from polymeric precursors (thermosets and thermoplastics) which usually produce amorphous or non-crystalline carbons.

SUMMARY OF THE INVENTION

The present invention comprises the use of precursors that can produce carbon foam preforms which result a reticulated structure having struts with fiber-like properties. The struts can be either crystalline, anisotropic, graphitizable carbons so that high strength and modulus, as found in current pitch-based fibers, can be reproduced within the strut regions (as defined below) of the carbonaceous foam, or isotropic nongraphitizable carbon. The solid strut regions within the foam could be tens to thousands of microns in length and have a diameter of tens of microns in width, leaving interconnected voids of tens to hundreds of microns in diameter so that high final bulk densities can be obtained after CVD or liquid phase densification. The thin characteristics of the strut regions within the foam will allow the crystallites within the mesophase precursor carbon to become preferrentially oriented along the axis of the strut mimicking the microstructures of carbon fibers. The bulk foam material can be controlled to provide either bulk isotropic or bulk anisotropic properties. Precursors include mesophase pitch, polyacrylonitrile ("PAN") and polyvinylchloride ("PVC") as well as some resins such as phenolic and furfuryl alcohol. Pitch precursors undergo liquid-crystal (mesophase) formation during pyrolysis and result in a carbon with crystalline order. Currently, mesophase pitches are available that already have liquid crystal properties and provide an ideal precursor for foams. The term "resin" may be considered to encompass pitch when either pitch or resin is used as a precursor for carbonaceous materials. It is desired to produce foams with controllable pore structure which is interconnected (reticulated) so that it can be densified by either chemical vapor deposition ("CVD"), liquid phase densification processes such as Hot Isostatic Pressing ("HIP"), Pressurized Impregnation Carbonization ("PIC"), Vacuum Pressure Infiltration ("VPI"), pitch or resin injection, or combinations of these densification processes.

The objectives of the disclosed inventions include:

(1) Production of a graphitizable reticulated foam preform in which the "strut" structure mimics the properties of carbon fibers (to produce a direct substitute for carbon fiber preforms). Fiber-like properties are obtained within the strut members by use of a liquid crystal precursor (such as mesophase pitch) and strain action (both longitudinal and shear) occurring during the foaming process (alignment of the liquid crystals along the struts created during foaming and enhanced during subsequent heat treatment processing).

(2) Production of a non-graphitizable, reticulated foam preform structure and subsequently deposit graphitizable material around the strut members so as to mimic the properties of a fiber. The graphitizable material may be deposited by CVD or wetting of the strut surfaces by a liquid crystal material.

(3) Production of a foam preform with a reticulated structure capable of being further densified by the conventional processes discussed above. The porosity created by the reticulated structure allows the diffusion of gases or the infusion of liquids into the interior of the structure.

(4) Producing foam preforms suitable for manufacture of carbon-carbon composites used as friction materials in aircraft brakes, for thermal management, as well as structural applications. The foam preform is then subsequently densified with carbon or a carbonizable material or other fillers to enhance structural, thermal or tribological properties, and to produce a friction material, or thermal management material, or structural material. The combined composite should possess the structural, thermal and/or tribological properties required for friction materials, thermal management materials, and structural materials applications.

The disclosed inventions provide advantages over prior methods of making carbon-carbon composite friction materials:

(1) Mesophase pitch as well as other selected thermoplastic precursors produce high quality crystalline graphitizable carbons. In additon, the strut regions of the carbon foam provide a continuous network of fibrous reinforcement, as compared with discontinuous reinforcement found in fiber reinforced composites. Therefore, foam preforms should lead to improved thermal transport. Thermal transport is an important consideration in aircraft brake heat sinks and in thermal management materials.

(2) The foam preform approach is expected to be inherently less costly than the use of carbon fibers in carbon-carbon composites because less processing is needed.

(3) Near net shape forming of the final part may be possible with foams because they can be readily molded or extruded.

(4) The foam preform bulk properties are expected to be controllable and homogeneously isotropic or anisotropic. In addition, it is expected material property anisotropy may be controlled using processing variables or post foaming processes.

The present disclosure provides solutions to the above by comprising a process of manufacturing a carbon-carbon composite material, comprising the steps of providing an open-celled carbon foam preform, and densifying the preform with carbonaceous material to provide the carbon-carbon composite material.

DETAILED DESCRIPTION

Methods of producing carbonaceous foam preforms suitable for aircraft brake applications include the pressurization and sudden release of pressure, and the addition of blowing agents and the like to thermoset or thermoplastic precursors, such as PVC or mesophase pitch. The foam forming portion of the invention should produce an open-celled structure having solid strut regions tens to thousands of microns in length, 10–20 microns in diameter or width, and interconnected voids or openings, controllable in size, of tens to hundreds of microns in diameter, and for some such applications 10–30 microns in diameter. The foamed material, if thermoplastic, is made thermoset by subjecting it to oxidative stabilization which essentially makes it nonfusible and less volatile thereby maintaining the foam structure without collapse during subsequent carbonization, heat treat and densification processes. For some high temperature thermoplastics stabilization can be reduced or eliminated completely. For thermoplastic materials, stabilization of the foam preform is performed in air at temperatures between 150 and 300° C. The stabilized foam is then carbonized by slow heating to 900–1600° C. to produce the carbonized preform. Following carbonization, an optional graphitization or heat treatment process may be performed to generate additional porosity amenable to subsequent densification and/or modify the strut properties. The preform is then densified by CVD, HIP, PIC, VPI, pitch or resin injection, or combinations thereof, and intermediately or finally graphitized to convert the densified matrix carbon to a graphite form.

The process may be generally described by the following steps:

Precursor: Thermoset (potentially graphitizable) or thermoplastic (typically graphitizable)

Foaming: Supersaturation with gas or chemical blowing agents

Stabilization: Oxygen stabilization for foams produced from thermoplastics

Carbonization: Conversion to carbon at 900–1800° C.

Optional Heat Treatment: Graphitization at 1600–2800° C. of the foam to modify strut properties and/or bulk porosity of previously densified preforms Densification: Multiple CVD; PIC; HIP; VPI, pitch or resin injection, or combinations thereof (with optional addition of friction modifiers)

Heat Treatment: Graphitization of the composite to modify properties at 1600–2800° C.

Making Foam Preforms

A material suitable for foaming is Mitsubishi AR pitch. This is a synthetic napthalene derived pitch which is 100% anisotropic mesophase. The napthalene pitch precursor is a coal tar derivative. A good overview of this material has been presented by Mochida et al., "Carbon Fibers From Aromatic Hydrocarbons" *Chemtech*, February 1995, page 29. AR pitch is prepared by the catalytic polymerization of naphthalene using an $HF/BF_3$ catalyst.

Figure 1:
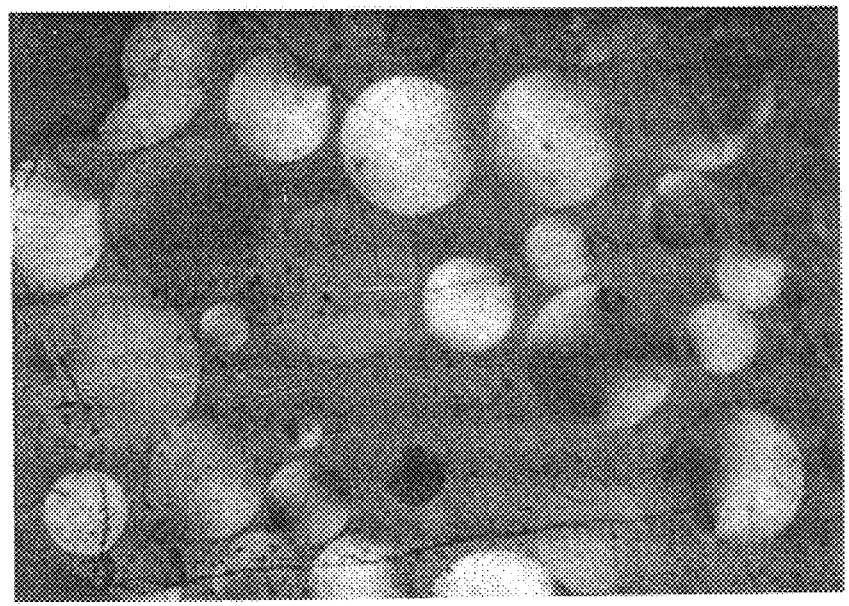
FIG. 1 is a photograph of a polished cross-section of a solidified pitch after heat treatment to a partial mesophase state.

In general, anisotropic mesophase is the intermediate product which occurs during thermal pyrolysis of certain aromatic hydrocarbons. Suitable mesophase pitch precursors can include petroleum, coal tar or synthetic precursors. As the hydrocarbon is heat treated in inert gas, it condenses to large, planar molecules, usually with evolution of hydrogen. These molecules may have a molecular weight of 500–1000 or more and a carbon/hydrogen ratio of about 1.5. As the molecules grow, they nucleate and grow a liquid crystal phase, called the mesophase, which appears as optically active spheres in an isotropic matrix. FIG. 1 is a photograph of a polished cross section through a solidified pitch after heat treatment to a partial mesophase; see Murdie et al., "Carbon-Carbon Matrix Materials", *Carbon-Carbon Materials and Composites*, Noyes Publications, Park Ridge, N.J., 1993, pages 105–167. The liquid crystal phase can be thought of as the stacking of planar molecules, as an intermediate step in forming graphitic platelets. A 100% mesophase material would consist entirely of this liquid crystal material.

Figure 2:
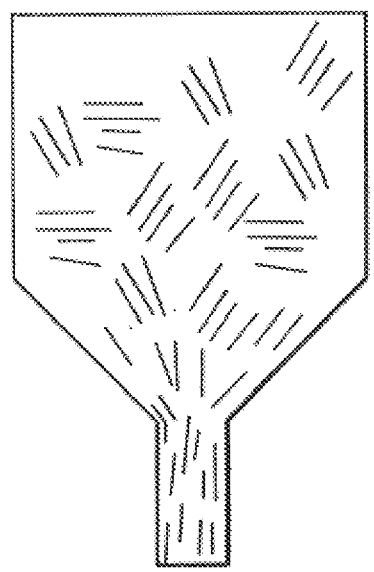
FIG. 2 is a schematic illustration of the alignment of mesophase crystals during extrusion through a die.

During shear, as in fiber spinning, the mesophase crystals are aligned by the shear strain. That is, during the process of forming the fiber by extruding the material through a die, the platelets are all aligned in more or less the same direction. This is illustrated schematically in FIG. 2.

The present invention comprises the rationale that foaming causes similar shear strains in resin and/or mesophase pitch precursors as those produced during extrusion through a die. Thus, the mesophase material is expected to align due to the shear which occurs locally during the formation of bubbles of the foam. Thus, the bubble walls will tend to form preferrentially aligned graphitizable structures.

Figure 3:
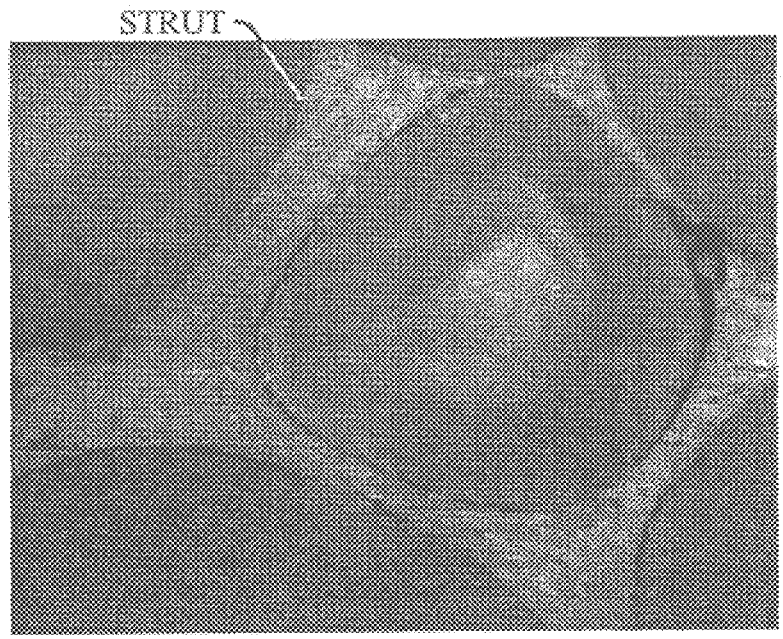
FIG. 3 is a photograph of a mesophase foam showing striations or alignment of the material of the foam.

We have demonstrated that this alignment occurs, as can be seen in FIG. 3. A sample of Mitsubishi AR pitch in pellet form was pressed in a die. It was heated to 300° C. and immediately pressurized with 800 psi of carbon dioxide (pressure should generally be above 500 psi). It is preferrable that the temperature be about 10–50° C. above the softening point of the material. It was then held at temperature for 60 hours, cooled to 275° C., held for less than two hours, and the pressure was released. Because the mesophase is optically active, it is possible to see the alignment of domains around the bubble in the figure. Striations are seen in the upper left strut in FIG. 3. It can be seen from the striations in the struts between the pores that there is a significant amount of orientation of the mesophase structure, giving fiber-like microstructure.

Preparation of Mesophase Pitch Foams

Figure 4:
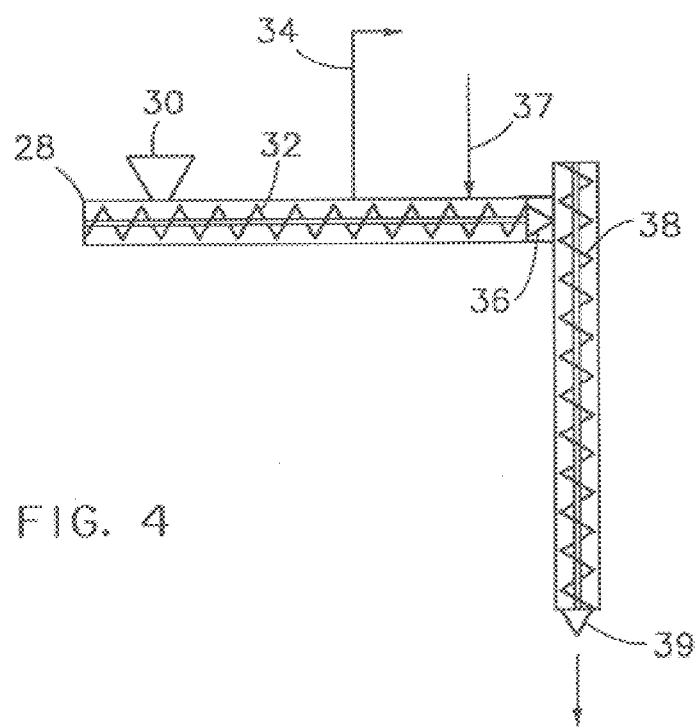
FIG. 4 is a schematic illustration of an extrusion system for pitch based foams.

To prepare pitch foams for commercial applications, it is expected that an extruder will be used. Extrusion systems for preparing thermoplastic foams are well known. A typical extrusion system for preparing foams is shown in FIG. 4. Cold pitch is placed in a hopper 30, and the screw 32 drives the material to the right. Through a combination of heating and shear, the polymer is melted. Next, the polymer is degassed, by pulling a vacuum at a port 34 on the barrel. Then, the extruder 28 pressurizes the polymer, up to the injection port 36. Adjacent the injection port 36, inert gas such as nitrogen or carbon dioxide is admitted at port 37 to the extruder 28 at controlled pressure and flow rate. From this point forward, pressure is maintained high to prevent foaming inside extruder 28. The pitch/gas mixture is transferred to the cooling extruder 38, where heat exchange systems extract heat as the pitch is transported toward the die. At the die exit or port 39, pressure is suddenly released, and foaming occurs.

Pressure/temperature cycle for foaming

A typical pressurization/depressurization cycle used for the resin and or pitch in an extruder have been simulated using a 1 gallon Parr autoclave. 15–30 gram samples of the resin were used without other additives. Design of experiment and trials in an extruder adapted for this purpose have been accomplished in order to obtain a good pore size and strut structure.

Figure 5:
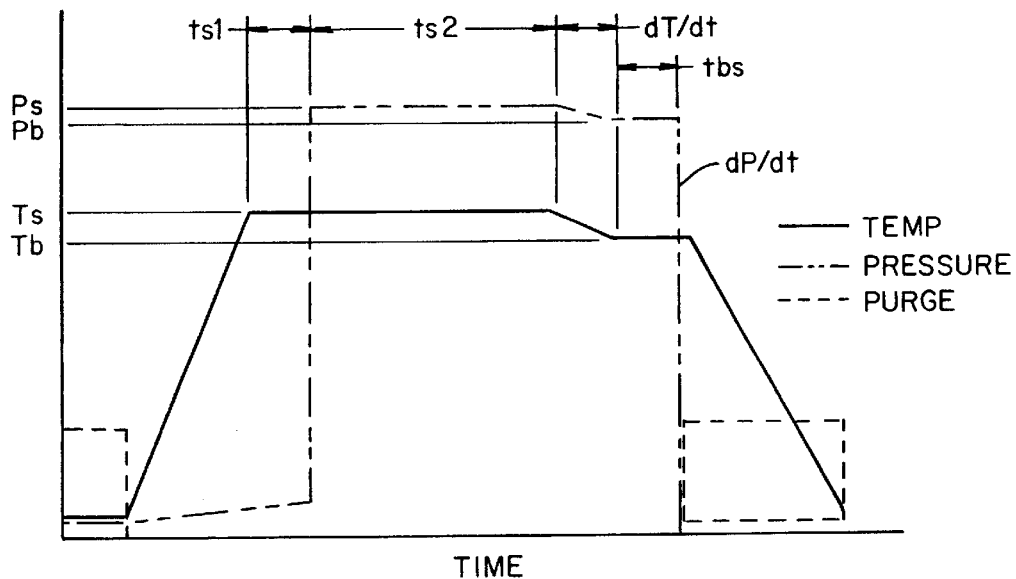
FIG. 5 is a graph illustrating the pressure/temperature cycle for foaming.

The general cycle for autoclave experiments is shown in FIG. 5. All experiments can be described by these curves. First the temperature is raised, as though the pitch were being melted in the extruder. Then, there is a hold at temperature while degassing occurs. Then gas pressure is applied. The pitch is then cooled to the blowing temperature, as though in the cooling part of the extruder. Then the pressure is released, as though the pitch were exiting the die. The soaks are much longer than expected for an extruder because there is no mixing. Typical time in an extruder is of the order of 10–20 minutes, while the time in the autoclave is of the order of several hours.

Figure 6:
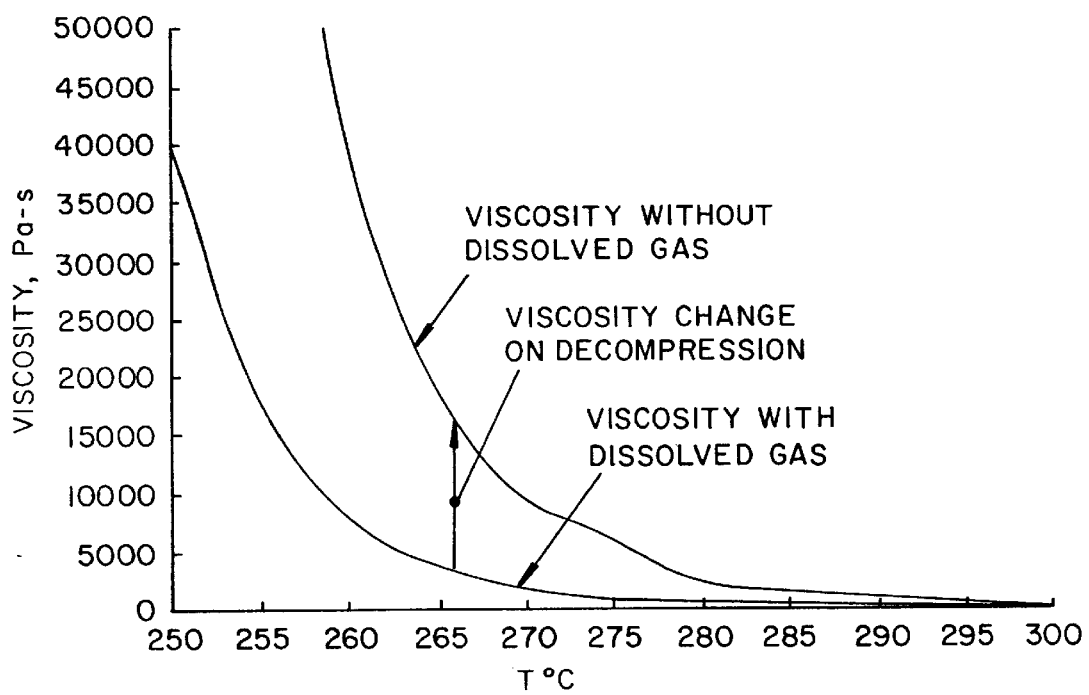
FIG. 6 is a graph illustrating the hypothesized viscosity/temperature relationship for foaming.

The reason for this cycle is based on what is shown schematically in FIG. 6. Gas is dissolved at high temperature, e.g. 300° C., where dissolution kinetics are high, and the pitch is a liquid due to melting. Gas dissolution lowers the viscosity and essentially melting is completed. Then the temperature is lowered to about 265° C., where, under pressure, the viscosity is still low. The dissolved gas plasticizes the pitch. When the pressure is released, the plasticizing effect goes away. There is simultaneous bubbling and freezing of the structure.

During the initial high temperature soak, the pitch is allowed to sit at 1 atmosphere pressure, with a nitrogen purge before and/or after pressurization. This is found to be necessary to allow volatile matter in the pitch to escape. Otherwise, the volatile material acts as an uncontrolled blowing agent, and nonuniform pore sizes are obtained.

It has been discovered that keeping the foam material warm, between approximately 60–120° C., until carbonization is important in order to prevent cracking of the foamed material. Although the foamed material will be brittle if allowed to cool below this range, the material may still be utilized in the subsequent process steps disclosed herein.

Following foaming, a suitable process is required to remove the external skin surrounding the reticulated structure. Mechanical or chemical processes may be used to remove the skin.

Isotropic thermosetting foams can be produced by a number of alternative foaming processes, eg. supersaturation of gas, and chemical blowing agents. With this approach, there is no need for stabilization.

Stabilization

When a foam is made from a thermoplastic such as a mesophase pitch, it may be necessary to crosslink the foam by oxidation before it can be heated to carbonization temperatures. Without this oxidation (stabilization) step, the pitch may melt when it is heated. This problem is well known. Carbon fibers made from pitch are stabilized by heating in an air oxidation oven. Failure of the oxidation step is readily seen when the foam bloats during the carbonization step. Use of solvated mesophase pitches offer the potential of foaming at low temperatures followed by carbonization at high temperatures without the need for stabilization.

One of the apparent difficulties with oxidation of a pitch foam is making sure that the foam has a sufficiently open cellular structure to allow oxygen to penetrate all of the pores during the oxidation step. An example of this kind of problem is illustrated in the following thermogravimetric analysis.

Figure 7:
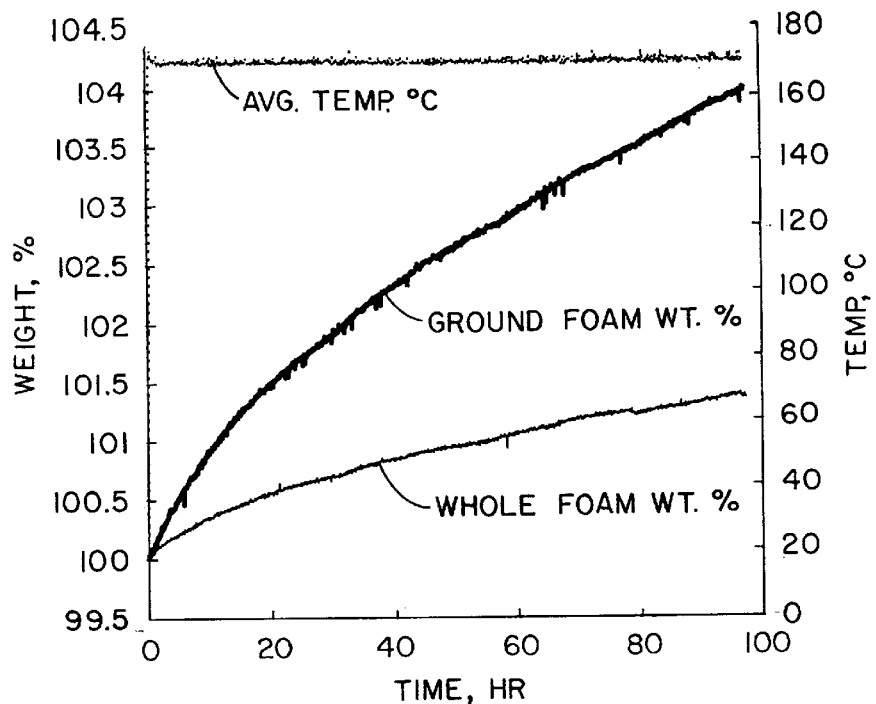
FIG. 7 is a graph illustrating the difference in weight gain upon oxidation when pores of a foam are open.

Two pieces of pitch foam, as blown, were prepared for thermogravimetric analysis. One sample was left as a piece of unmodified foam, and a second sample was ground in a mortar and pestle. They were heated at 5° C. per minute to 170° C., and then held for 96 hours. The entire analysis was carried out in flowing air. FIG. 7 illustrates differences in weight that provide clear evidence that there are many closed pores in the first sample of whole foam. During the oxidation, air is unable to penetrate the pores, therefore, oxidation occurs much more slowly. By grinding the material, all of the closed porosity is opened, and oxygen in the air readily penetrates the material of the second sample. Of course, this analysis or experimental approach is not satisfactory for production, and a means is needed to obtain open porosity of the foam which can be readily oxidized. Material of essentially 100% open porosity can be obtained, e.g. as described in Bonzam, et al U.S. Pat. No. 4,276,246. However, efforts to directly blow a microcellular foam with a high fraction of open porosity have generally led to foams which are too weak.

First Method

We believe that incomplete stabilization arises because some cells are closed. That is, they do not have an open path to the outside of the material. Thus, some means of opening the cells is required. By placing the parts in a pressurized atmosphere, either of two things may happen. The walls closing off the cells may break open due to high differential pressure, or the partial pressure gradient for oxygen will be increased locally to increase the rate of diffusion of oxygen into closed-off areas. Thus, complete stabilization can be achieved in a shorter time. A general method for practicing this portion of the invention comprises placing a foam is preform produced from an isotropic or mesophase pitch in an autoclave filled with a nitrogen-oxygen mixture. The foam preform is subjected to one or more cycles of pressure up to 1500 psi while heating to between 100 and 300° C. for up to 100 hours. During pressurization and heating, cell walls of the pitch material may be broken, and stabilization or crosslinking of the pitch may occur. It is foreseen that the fraction of oxygen in the mixture may range from 0.002 to 0.2.

Figure 8:
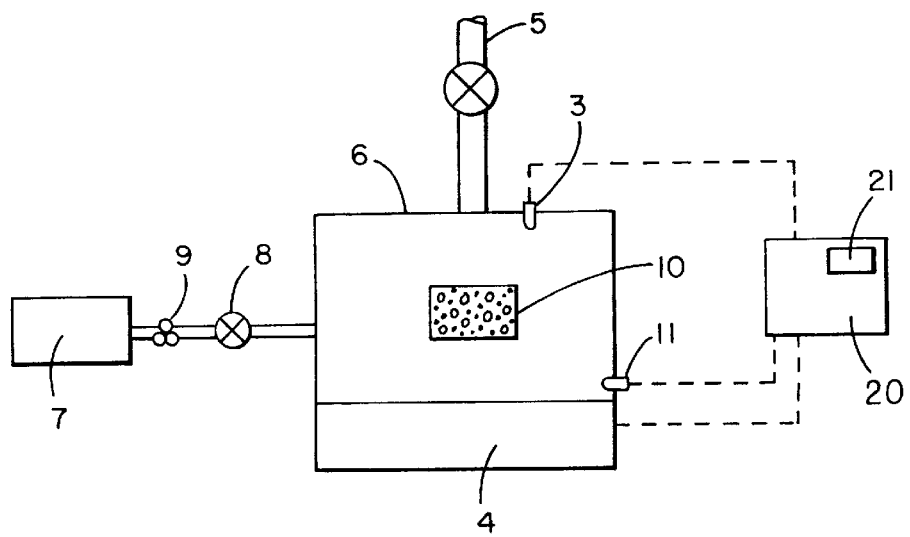
FIG. 8 is a schematic illustration of a system for stabilizing a pitch foam.
Figure 9:
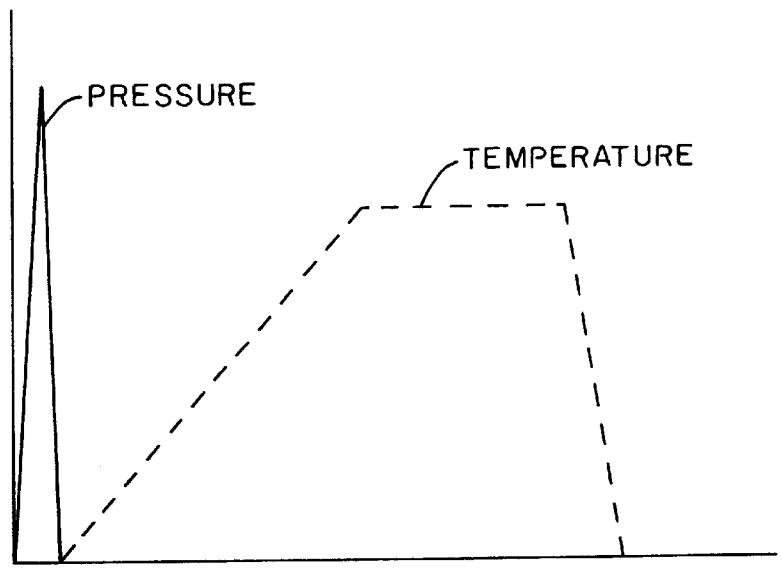
FIGS. 9–12 are graphs illustrating pressure and temperature cycles for stabilizing a pitch foam.
Figure 10:
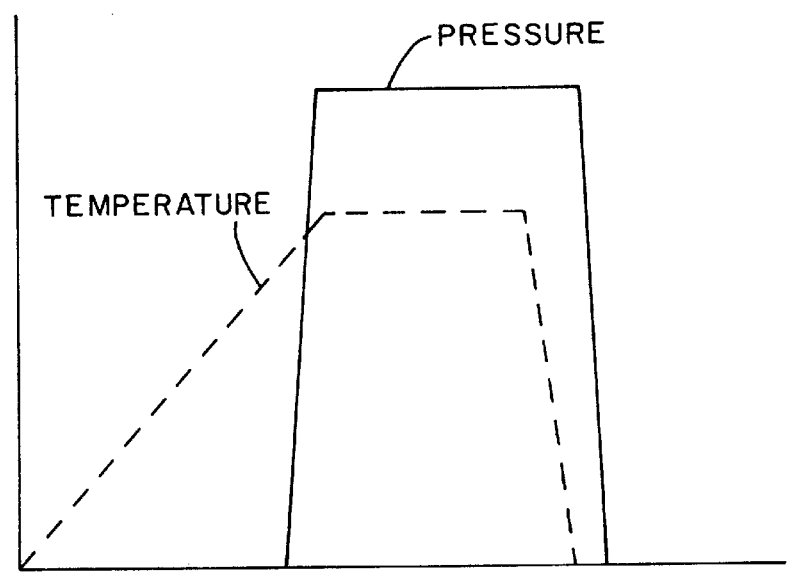
Figure 11:
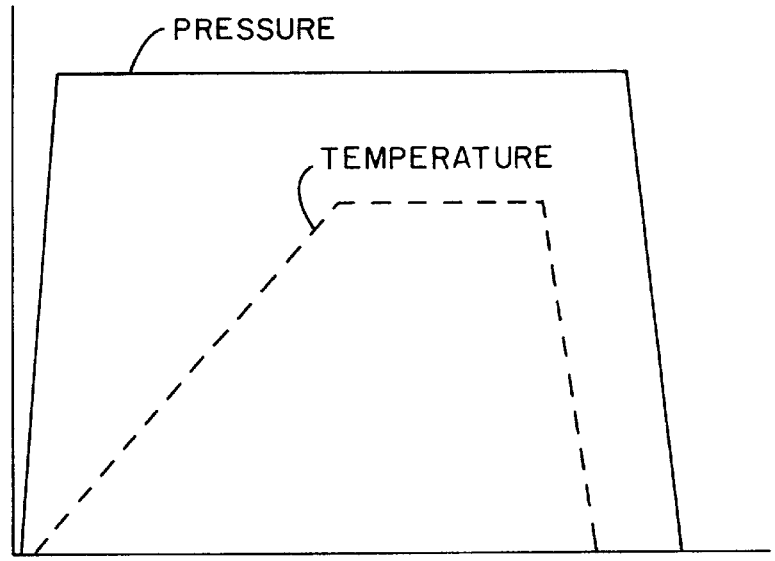
Figure 12:
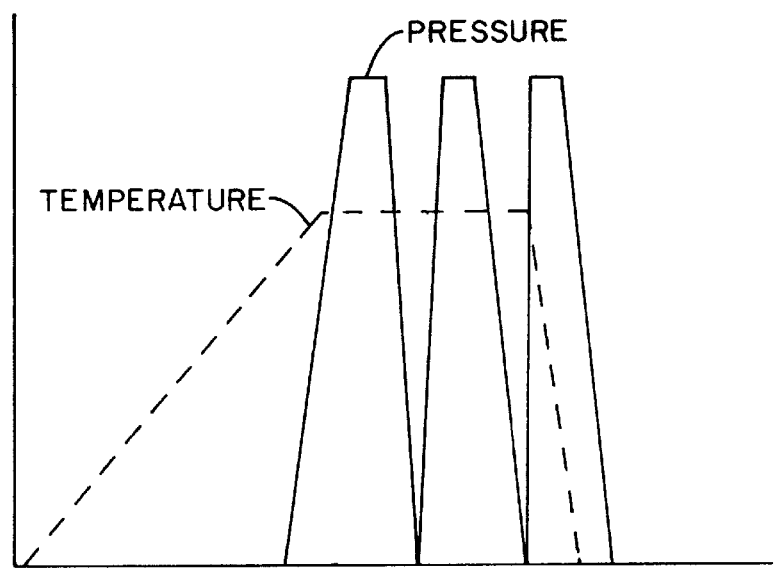

As illustrated in FIG. 8, a foamed sample 10 is enclosed in a pressure vessel 6, and the nitrogen-oxygen mixture 7 is admitted to the vessel through valve 8 regulated by pressure regulator 9. Pressure is monitored by a transducer 3 connected to a readout 21 of controller 20. The vessel 6 is heated externally by a heater 4, and temperature is sensed by a thermocouple 11 and controlled by the programmable controller 20. Pressure is relieved from vessel 6 via a vent 5. From this equipment, a process has been developed for opening the cells of the foam material to allow access to air. A sample of foam Mitsubishi AR pitch, was heated to 100°C., held for approximately 1 hour, and then pressurized with 1500 psi of nitrogen. It was allowed to soak at this pressure for 1 hour, and then pressure was released. This foam was then oxidized at 170° C. for 96 hours, yielding a weight gain of 8.5%. The foam was then carbonized to 900° C. in nitrogen (4 hour soak), yielding a weight loss of 21%. There was very little evidence of bloating. Thus, the disclosed process yields a foam acceptable for subsequent densification. Several variations of the process may be used. One variation, illustrated schematically in FIG. 9, would be to pressurize the vessel with standard air to 150–1500 psi for 1 minute to 1 hour, relieve the pressure, and then ramp up to a temperature between 100 and 250° C. The temperature would be held for up to 96 hours, then the foam cooled and removed. This variation seeks to use the pressure to break the cell walls of the material, and then the application of temperature at one atmosphere would provide the desired stabilization. Another variation, FIG. 10, is similar to the variation illustrated in FIG. 9, except the temperature is raised first and then the pressure is increased. Another variation, FIG. 11, would be to initially pressurize to 150–1500 psi and hold the pressure for the duration of the thermal cycle. The autoclave would be ramped to a temperature of between 100 and 250° C. and held for 96 hours, then the foam material cooled and removed. This variation would effect simultaneously both cell wall opening and increased oxygen pressure gradient. The variation of FIG. 12 is similar to that of FIG. 11, except that the pressure is cycled.

Because the diffusion of oxygen into, and oxidation products out of, the foam structure can be very difficult, alternative methods of stabilization may be used. The difficulty of air to flow in and out of a foam is precisely the reason foams are used for thermal insulation. This problem may be exacerbated by the thickness of the struts. While the ideal struts are 10–20 microns thick, they may be as much as 100 $\mu$m thick, compared to about 10 $\mu$m thick for pitch fibers. Thus, diffusion of oxygen into the struts, once it is within the foam, is more time consuming than for fibers of similar materials. Thus, two methods other than the above oxidative pressurization method are disclosed below. Each provides a means to enhance the flow of oxygen in, and reaction products out, of the foam preform during stabilization.

Second Method

The preforms are placed in a metal chamber capable of being heated to at least 300° C., while simultaneously being evacuated to less than 250 torr (0.33 atmospheres). By alternately evacuating and admitting air, the depleted air and reaction products are removed with each cycle, and fresh air added. Thus, the reaction is speeded up greatly, as the part is always exposed to fresh reactant, and the products are removed, in accordance with LeChatlier's Principle.

Figure 13:
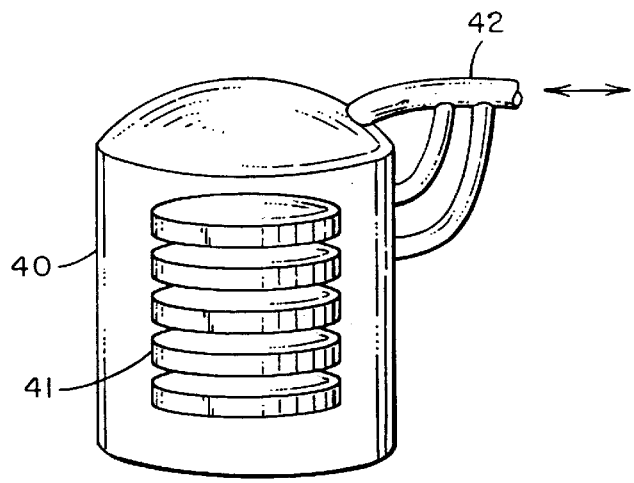
FIG. 13 is a schematic illustration of a vacuum/pressure chamber for enhancing oxygen flow during stabilization of a pitch foam.

An "iron lung" method is shown schematically in FIG. 13. Parts or preforms 41 are stacked in the vacuum vessel 40 having pipings 42, preferably with spacers between or on individual screens. The preforms are heated to the stabilization temperature, which may range from 150° to 300° C. Heating may be either external or internal to the vessel.

Figure 14:
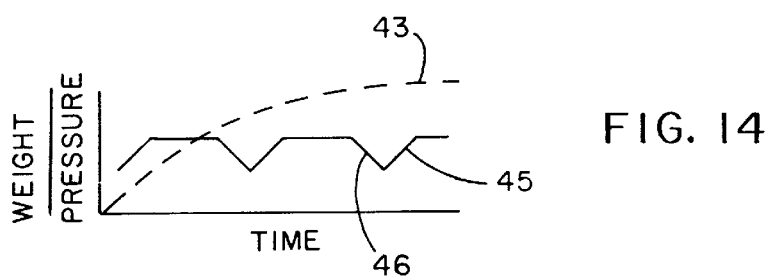
FIG. 14 is a graph of pressure and time and part weight gain resulting from enhanced oxygen flow during stabilization.

The entire cycle is envisioned to take less than 24 hours. During this time, a vacuum pump is alternately cycled on and off, extracting air and venting back through the port 42. The vessel is alternately pumped down to less than 250 torr, possibly as low as 1 torr, and then refilled with fresh air or other oxidizing gas up to 760 torr. One possible waveform for the pressure vs. time curve is shown in FIG. 14. The pressure in the chamber is lowered 46, then raised 45, then held 44 near one atmosphere. Nominal times for the pump-down and refill are of the order of 20 seconds each, with the hold 44 being about 5 minutes. This is not meant to exclude step functions, exponential, sinusoidal, or other waveforms. The maximum frequency is limited only by the pumping capacity, but we envision a reasonable range of frequencies to range from 1/minute to 1/hour. For each system there is an optimum frequency, depending upon part size, vessel size, choice of material, reaction rate, temperature, capital and utility costs. Part weight increases, according to the oxidation curve 43, to an optimal value around 8%.

Figure 15:
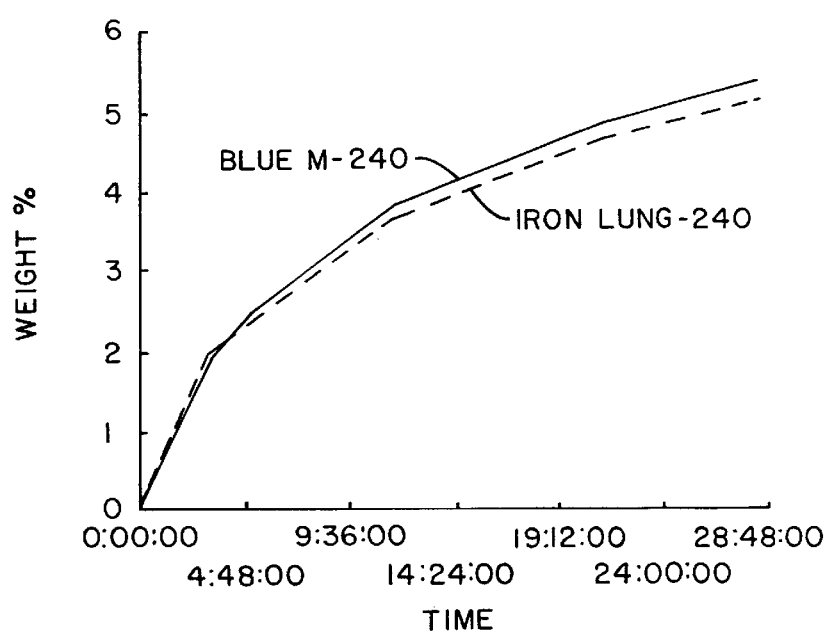
FIG. 15 is a graph illustrating the weight gain effected by the pressure chamber device of FIG. 13 and an air circulating oven.

An illustration of the comparison of weight pickup between the "iron lung" device and an air circulating (Blue M) oven, both operating at 240° C. is shown in FIG. 15. Initially the iron lung shows an increased weight pickup, although in the later stages of the process it does not show an advantage in this particular comparison where a small sample was used in a large enclosure. It is believed that when this method is scaled up to production level the enclosure or chamber will be substantially full of foam such that the need for extracting reaction products and supplying reactive gas will be necessary.

Third Method

Figure 16:
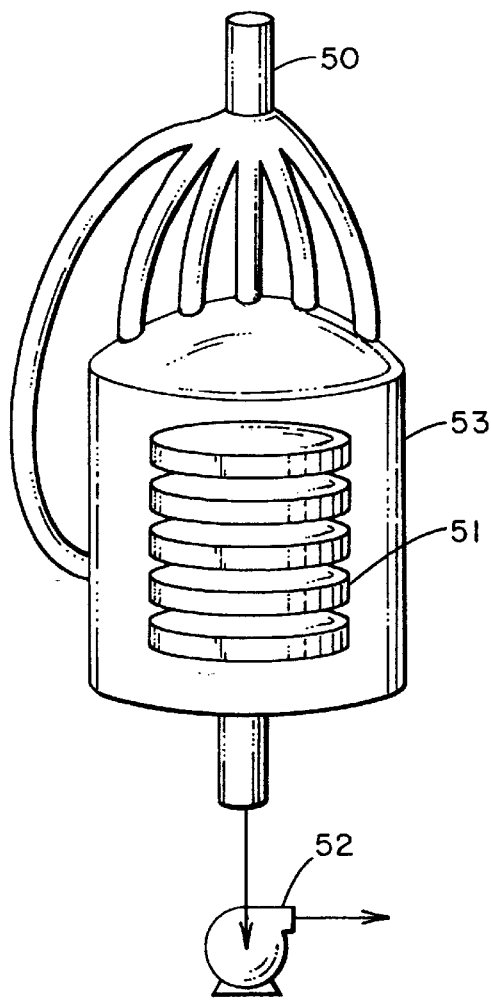
FIG. 16 is a schematic illustration of a continuous flow device for enhancing oxygen flow during stabilization of a pitch foam.
Figure 17:
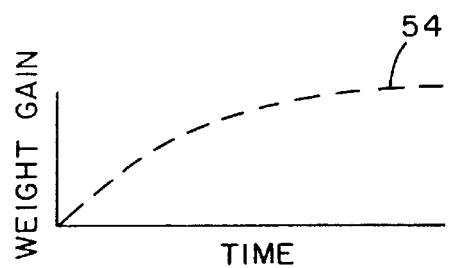
FIG. 17 is a graph illustrating weight gain from the enhanced oxygen flow of the device of FIG. 16.

An alternative method to achieve the same objective would be to mount the parts or preforms in a furnace such that there is a high flow of gas through the part. In this method (the wind tunnel method), the parts are stacked in a container which has a pressure gradient. Air and/or oxidizing gas is admitted at one end, as well as at ports along the side, while simultaneously one or more vacuum pumps draw on the other end, creating a pressure gradient across the entire stack of parts. This achieves the desired objective by insuring reacting gas gets to the surface, and reaction products are removed simultaneously. The wind tunnel method is shown schematically in FIG. 16. Air or other oxidizing gas is admitted at one end 50. This gas may also be admitted along the sides 53. The preforms 51 are supported periodically by screens, which are not shown. The pressure drop across the vessel is achieved by drawing continuously with a high rate vacuum pump 52. The preform weight gain 54 is shown schematically in FIG. 17.

Both methods could incorporate an internal scale to measure weight pickup, to provide a feedback variable which would indicate when the stabilization is substantially complete. We believe that both methods will accomplish the desired goals. The iron lung method may be easier to implement and operate from a manufacturing point of view, while the wind tunnel method is expected to be faster. Such carbonaceous foam materials may be densified subsequently with carbons, or other filler materials, to be used as thermal management materials, structural materials, or friction materials in automotive or aerospace applications.

Using a solvated mesophase pitch, a foam preform can be produced by the methods outlined above. Once removed, the "solvent" fraction of the mesophase ensures that the mesophase pitch has a higher softening point than the onset temperature of carbonization. Thus, the mesophase carbonizes before it can soften, thereby eliminating the requirement for stabilization.

Carbonization

The next step in the process is carbonization. This process is generally well known to those skilled in the art. The stabilized polymer is heated in a retort under inert or reducing conditions until the hydrogen and oxygen in the molecular structure has been driven off. Typically, this process is performed by burying the foam preforms in a bed of activated carbon, enclosed in a superalloy retort with a sand seal. The retort is purged gently with nitrogen for approximately 1 hour, to accomplish several changes of the enclosed air. Then it is heated to 900° C. in 10–20 hours, and thence to 1050° C. in 1–2 hours. The retort is held at 1050° C. for 3–6 hours, then allowed to cool overnight. Carbonization can be carried out up to 1800° C., however, the amount of additional hydrogen and oxygen removed during this treatment is expected to be small.

Heat treatment

If it is desired to modify the mechanical, thermal, and chemical properties of the carbon in the struts, the preforms may be heat treated in the range of 1600° to 2800° C. The effect of such a treatment on graphitizable materials is well known. Higher temperatures increase the degree of order in the material, as measured by such analytical techniques as x-ray diffraction or Raman spectroscopy. Higher temperatures also increase the thermal conductivity of the carbon in the struts, as well as the elastic modulus. However, higher temperatures may also tend to decrease the strength somewhat.

The process of heat treatment of these materials is very similar to that used for carbonization. The preforms are again buried in activated carbon, to prevent oxidation of the high surface area foam. A carbon retort is used, since superalloys are not suitable for the high temperatures found in heat treatment. A continuous purge of nitrogen is typically used outside of the retort. In this process, we inductively heat a graphite susceptor which forms a shell around the retort, and then heat is radiated inward to the retort. The cycle for heat treatment is not highly defined. Typically, heating at the rate of 50°/hour up to 1100° C. is recommended to minimize thermal shock of the parts. The heating rate from 1100° C. to the peak temperature can be done at 100° per hour. A 4 hour hold at the peak temperature is recommended, to guarantee that all preforms reach the desired temperature. Cooling can be performed at the furnace's natural cooling rate, or controlled to a cooling rate of less than 100°/hour to minimize thermal shock.

Densification

The methods for densifying a carbon preform are well known to those experienced in the fabrication of carbon-carbon composites. The most obvious techniques are chemical vapor deposition (CVD) of carbon, also known as chemical vapor infiltration (CVI), and pitch impregnation followed by carbonization. A combination of these techniques are also used. Multiple cycles of densification are almost always required.

In a CVD/CVI process, the carbonized, and optionally heat treated, foam preforms are heated in a retort under the cover of inert gas, typically at a pressure below 100 torr. When the parts reach a temperature of 900° to 1200° C., the inert gas is replaced with a carbon-bearing gas such as methane, ethane, propane, butane, propylene, or acetylene, or combinations of these gases. While the preforms are held in this environment, the carbon-bearing gases decompose, depositing carbon on the preforms, and releasing hydrogen to the furnace exhaust. Depending upon the pressure, temperature, and gas composition, the crystallographic structure and order of the deposited carbon can be controlled, yielding anything from an isotropic carbon to a highly anisotropic, ordered carbon.

A whole family of processes utilizing pitch impregnation are well known. Vacuum Pressure Infiltration ("VPI") is a method of choice for initially impregnating the pitch into the preform. The preform is heated under inert conditions to well above the melting point of the impregnating pitch. Then, the gas in the pores is removed by evacuating the preform. Finally, molten pitch is allowed to reinfiltrate the part, as the overall pressure is returned to one atmosphere or above. Typically on large scale operations, such as is carried out by FMI (Biddeford, Me.), the pitch is heated in a separate vessel, from the preform. When it is time to infiltrate, the pitch is transferred by a closed pipe from the pitch reservoir to the vessel containing the part by gas pressure. Typically the maximum pressure achieved is 1 atmosphere.

In preliminary experiments, VPI was performed by burying the part in solid pitch particles, heating under 1 atmosphere of inert gas until the pitch is fully molten. A vacuum is slowly applied (1 inch of mercury/minute or less) until the vessel is fully evacuated to below 25 inches of mercury. Then, the inert gas pressure is restored to the range of 1–100 atmospheres. The preform can be subsequently cooled or the carbonization step can be continued without delay.

Another method for infiltrating preforms with pitch is assymetric pitch injection. In this process, a preform is infiltrated by flowing pitch through the part in a pressure gradient. When sufficient pitch has been absorbed, the process is halted.

Carbonization of the infiltrated pitch can be carried out either in a furnace, a hot isostatic press (HIP), an autoclave, or in a uniaxial hot press. In each of these techniques, the impregnated part is heated to the range of 600° to 1000° C., while maintaining an inert atmosphere in the pressure range of 1 to 1000 atmospheres. The higher the pressure, the higher the carbon yield achieved, although the biggest gains in carbon yield are achieved at moderate pressures, up to 5000 psi.

Heat Treatment

An intermediate or final heat treatment to the preforms is usually applied to modify the crystal structure and order of the carbon. This process is typically very similar to the heat treatment of the foam, described above.

Final Machining

Finally, the material is machined to the usable shape of a friction material or other structural component. An oxidation protection coating or treatment can be applied if desired.

Example Friction Material

Figure 18:
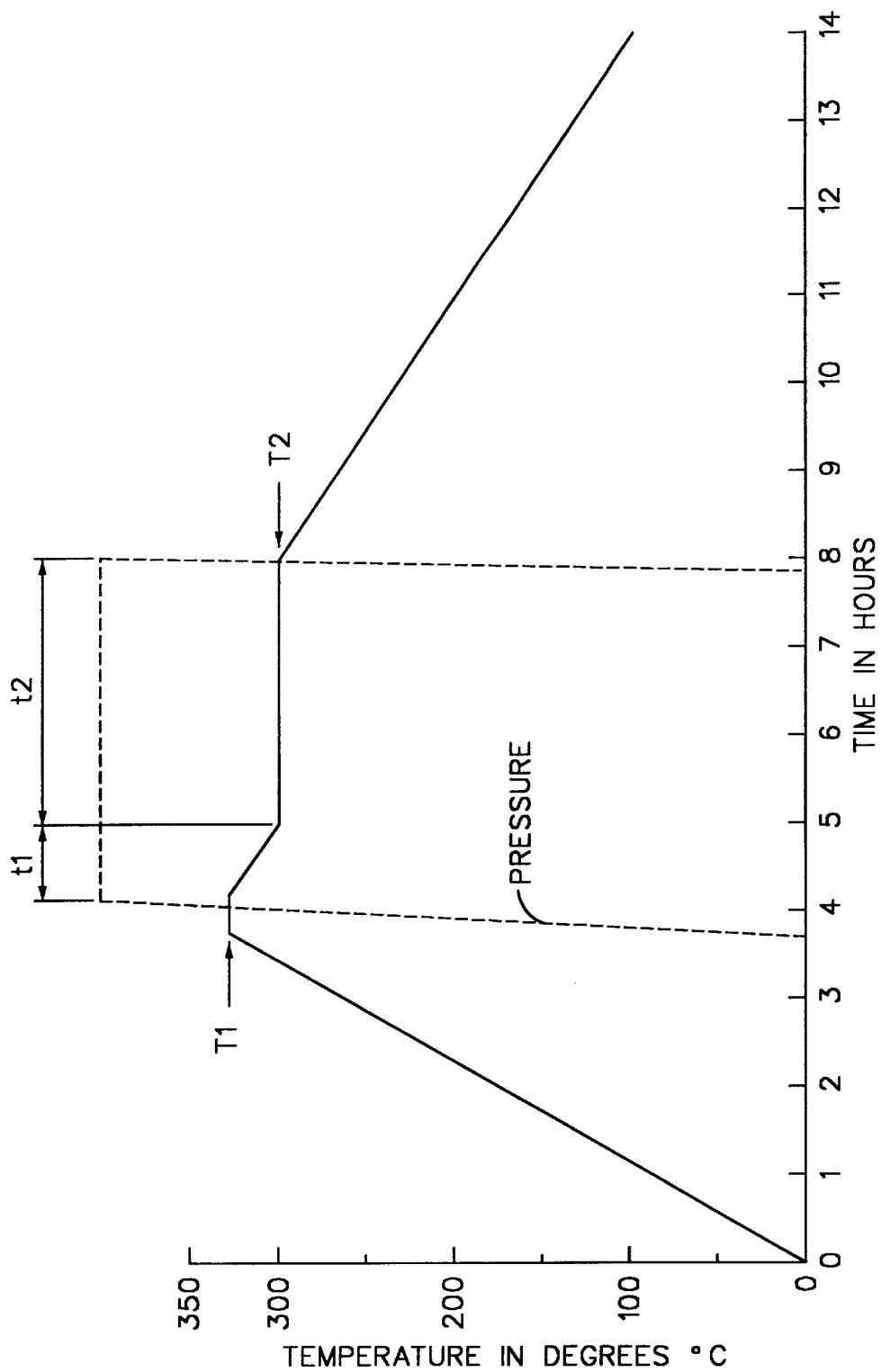
FIG. 18 is a graph illustrating the pressure/temperature cycle for making a pitch foam preform in accordance with the present invention.

A foam preform was manufactured from Mitsubishi AR synthetic mesophase pitch, ARA 24, as follows. A charge of 170 grams of AR pitch was placed in an aluminum foil boat in the bottom of a 1 gallon steel pressure vessel. The vessel was slowly heated until the temperature measured at the lid was 330° C. It is preferrable that the temperature be about 10–50° C. above the softening point of the material. In previous experiments, it had been found that the temperature at the resin was approximately 24° higher than the temperature at the lid. Pressure was increased to 1600 psi of nitrogen. After a short soak, the temperature was reduced to 290°, as measured at the lid, or 314° estimated at the resin. The part was held for 4 hours at 290° C., and then the pressure was rapidly relieved. The vessel was then cooled over a period of 6 hours to room temperature. The pressure/temperature cycle is shown in FIG. 18. This foam preform had an open porosity of approximately 82%, and an average pore size of 300–350 μm.

The foam preform was then stabilized by heating in air in a Blue-M air circulating oven. The preform was slowly heated to 240° C. (in about 10 hours), and then held for 96 hours at 240° with air circulation. The preform was then slowly cooled to room temperature.

The foam preform was then carbonized in a Huppert char furnace with a superalloy retort, using a sand seal, with the preform resting on a bed of activated carbon. The preform was carbonized in an inert atmosphere by heating as follows: The retort was purged gently with nitrogen for approximately 1 hour, to accomplish several changes of the enclosed air. Then, with the purge turned off, it was heated to 900° C. in 15 hours, and thence to 1050° C. in 1.5 hours. The retort was held at 1050° C. for 4 hours, then allowed to cool overnight.

The foam preform was then densified with commercially available AlliedSignal 15V pitch using 4 cycles comprising a combined VPI ("Vacuum Pressure Infiltration) and PIC ("Pressure Impregnation Carbonization) process, as follows.

The part was heated to 250° C. while immersed in pitch. The vessel was evacuated to less than 100 torr. Then the vessel was pressurized to 1600 psi, and the part cooled under pressure. The final pressure at room temperature was 1100 psi. After inspection, the vessel was repressurized to 700 psi. The vessel was heated to approximately 600° C. During that time, the pressure reached about 2100 psi. The experimental preform was charred by heating to 1050° C. under nitrogen, using the same char cycle described above.

The preform or part was reimpregnated with 15V pitch by immersing the part in powdered pitch, and heating to 250° C. The vessel was first evacuated to less than 100 torr then repressurized to 1600 psi. Pressure was relieved before cooling in this case. After inspection and cleaning of the vessel, the part was replaced in the pressure vessel and the vessel pressurized to 700 psi. The vessel was heated to a peak temperature of 605° C., and the pressure increased to 1850 psi. The vessel was cooled under pressure, and the part removed. The part was once again charred by heating to 1050° C. under nitrogen.

The part was reimpregnated a third time, again by heating to 250° C., evacuating, and repressurizing to 1600 psi. Following this, the part was charred under pressure to 600° C. and 1960 psi, and cooled under pressure. Finally the part was charred under inert conditions, heating to 1050° C. in nitrogen.

At this point, experimental dynamometer disks were machined from the part. A pair of rings were machined 2.188" O.D. 1.375" I.D. by 0.27" thick.

A fourth impregnation and carbonization was performed. Again, the rings were heated in powdered 15V pitch to 250° C. The vessel was evacuated, then repressurized to 1600 psi. The vessel was cooled under pressure. The pressurized carbonization was performed as before, first pressurizing to 700 psi, then heating to 600° C., allowing the pressure to rise to about 1900 psi. The vessel was cooled under pressure. The rings were charred, heating to 1050° C. under inert conditions.

Figure 19:
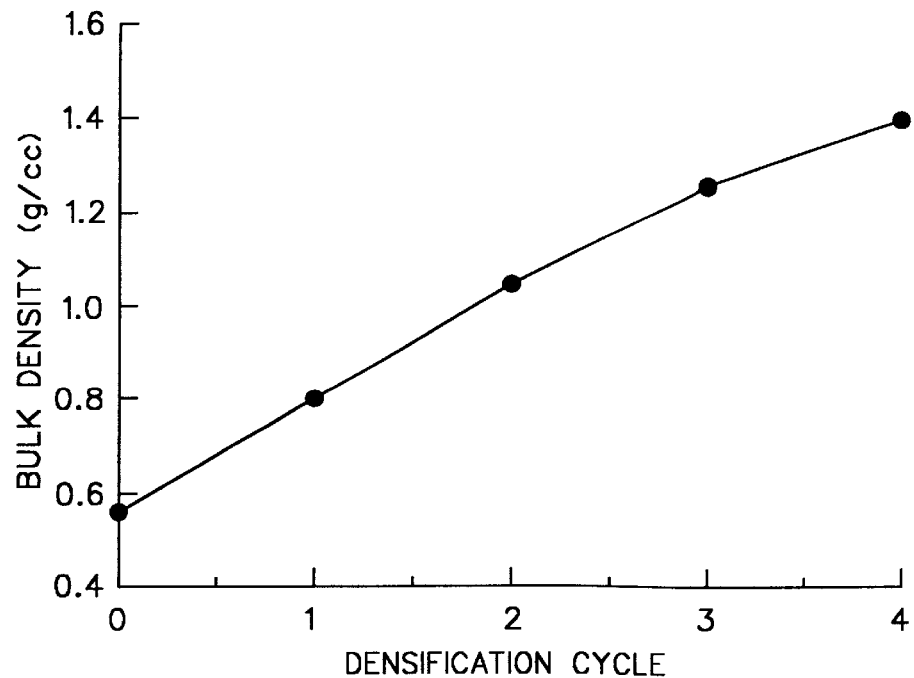
FIG. 19 is a graph of the increase in density as the material of the present invention is densified.

The part density through the above densification process is shown in FIG. 19. A density of 1.4 g/cc was produced and is sufficient to demonstrate the principles of this invention.

Figure 20:
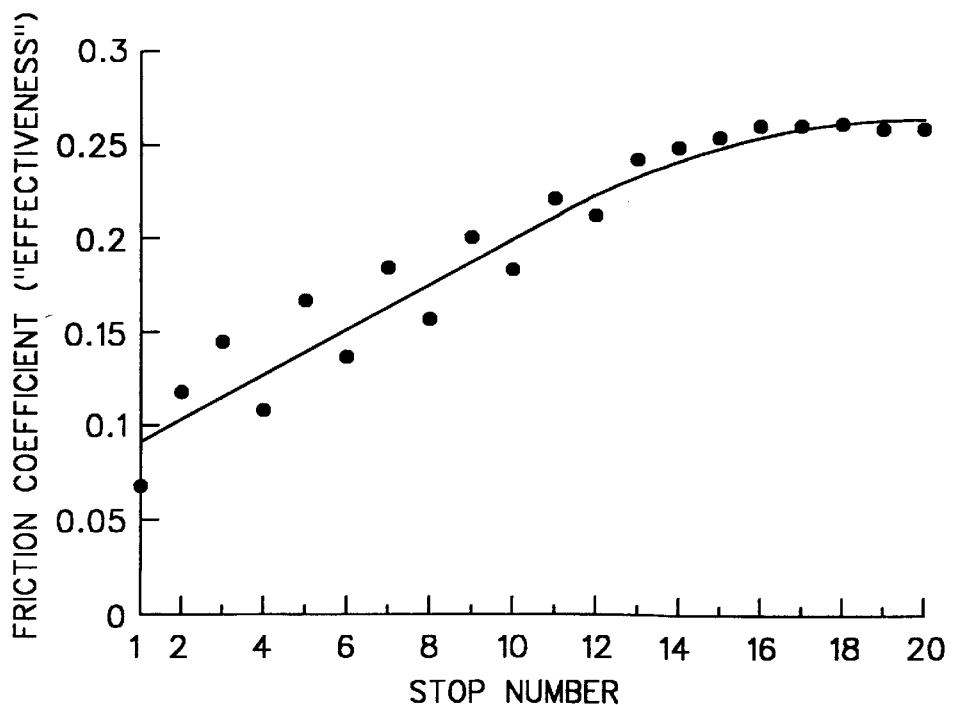
FIG. 20 is a graph illustrating the brake effectiveness of friction coefficient of a friction material of the present invention.

The rings were then tested on the Link subscale dynamometer by running 20 brake stops. The inertia for this unit is 0.1323 slug-ft$^2$. The rotor was accelerated to 6400 rpm, and then a pressure of 500 lb was applied. Torque, pressure, and speed are measured throughout each stop. The brake effectiveness (friction coefficient) during this test increased from an initial value of approximately 0.1 to a stabilized value of about 0.26. The effectiveness is plotted in FIG. 20. The process and experimental parts demonstrate clearly the capability of this material to perform as a friction material, as confirmed by the tests and characterics of the material. With additional optimization of the process, this friction material and its performance can be improved.

Figure 21:
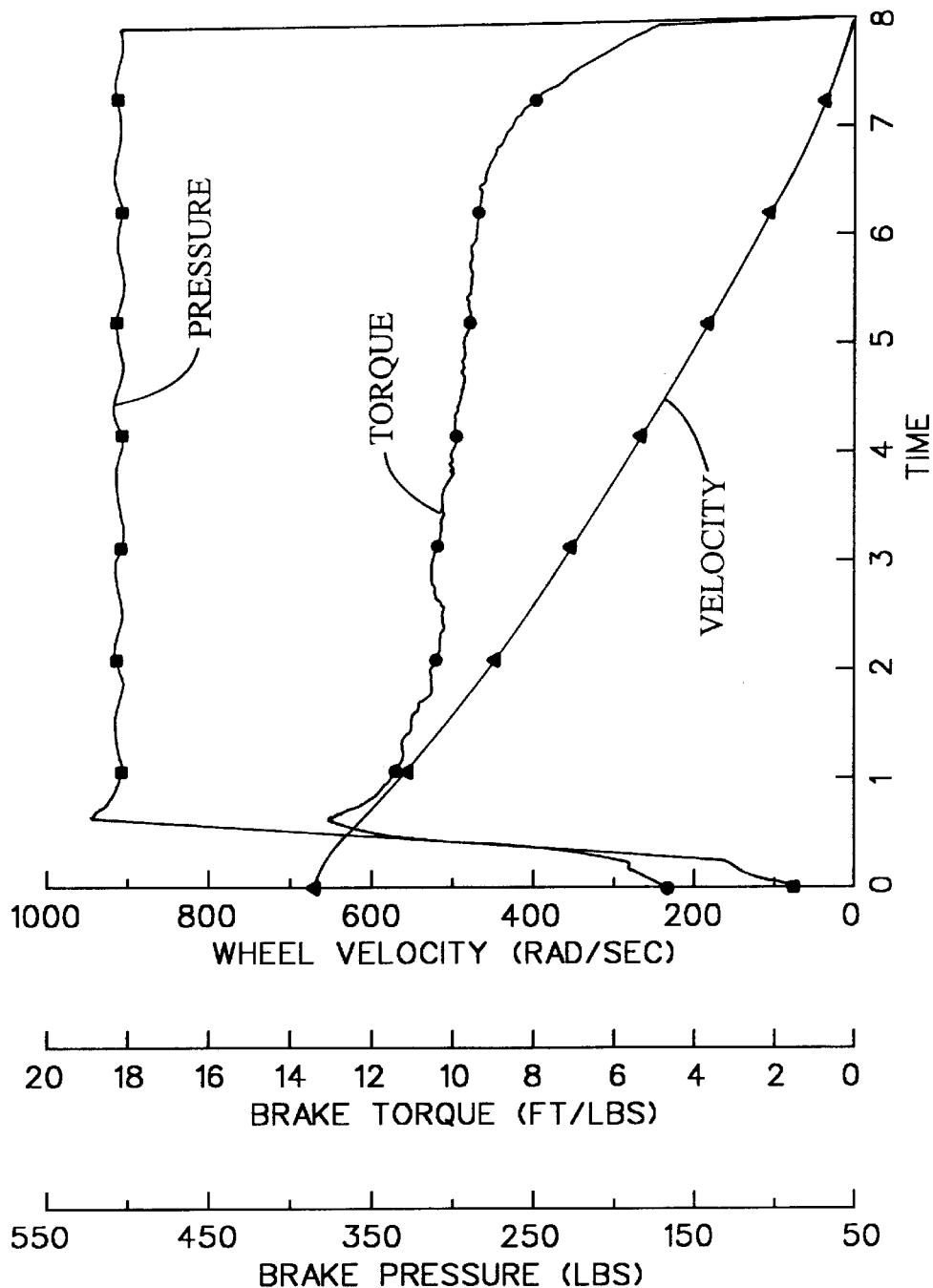
FIG. 21 is a graph illustrating the braking torque curve of a friction material made in accordance with the present invention.

The torque performance of this experimental friction material has many desirable characteristics. A typical torque curve of the friction material during a braking stop is shown in FIG. 21 which also illustrates the pressure and velocity curves. The torque curve is smooth, and declines gently at the end of the stop. In current conventional materials, frequently the torque curve increases at the end of the stop, leading typically to undesirable increased noise and vibration.

The wear for this friction material was measured and is listed below.

|  | Value | Units |
|---|---|---|
| Average weight loss | .036 | grams/surface/stop |
| Average linear wear | .000646 | inches/surface/stop |

The process and friction material of the invention disclosed herein, comprising a foam preform densified by any one or combination of several densification processes, clearly has significant potential for use in braking and clutch assemblies of numerous applications.

We claim:

1. A process of manufacturing a carbon-carbon composite material, comprising the steps of providing an open-celled carbon foam preform from a mesophase pitch which includes increasing the temperature of the mesophase pitch to effect dissolution of gas and then decreasing the temperature before foaming the mesophase pitch, the foam preform being graphitizable, and densifying the preform with carbonaceous material to provide the carbon-carbon composite material.

2. A process of manufacturing a carbon-carbon composite friction material, comprising the steps of providing an open-celled carbon foam preform from a mesophase pitch which includes increasing the temperature of the mesophase pitch to effect dissolution of gas and then decreasing the temperature before foaming the mesophase pitch, the foam preform being graphitizable, and densifying the preform with carbonaceous material to provide the carbon-carbon composite friction material.

3. The process in accordance with claim 1, further comprising the step of carbonizing the preform prior to densification.

4. The process in accordance with claim 1, further comprising the step of oxygen stabilizing the preform prior to carbonization to provide a graphitic foam preform.

5. The process in accordance with claim 1, wherein the step of densifying comprises one of CVD, HIP, PIC, VPI, pitch and resin injection, and any combination thereof.

6. The process in accordance with claim 1, wherein the cells prior to densification have an average pore size of less than 500 $\mu$m.

7. The process in accordance with claim 2, further comprising the step of carbonizing the preform prior to densification.

8. The process in accordance with claim 7, further comprising the step of oxygen stabilizing the preform prior to carbonization to provide a graphitic foam preform.

9. The process in accordance with claim 2, wherein the step of densifying comprises one of CVD, HIP, PIC, VPI, pitch and resin injection, and any combination thereof.

10. The process in accordance with claim 2, wherein the cells prior to densification have an average pore size of less than 500 $\mu$m.

* * * * *